United States Patent Office 2,699,437
Patented Jan. 11, 1955

2,699,437

POLYMERS OF DIALKYLAMINO ARYL AMIDES OF ETHENEDIOIC ACIDS

Gaetano F. D'Alelio, Pittsburgh, Pa., assignor to Koppers Company, Inc., a corporation of Delaware No Drawing. Application August 31, 1951,
Serial No. 244,696

20 Claims. (Cl. 260—78)

This invention relates to new polymeric materials and is particularly directed to the polymerization products obtained by polymerizing a mass comprising as a new monomer an N-(dialkylamino aryl) amide of an ethylene alpha, beta-carboxylic acid hereinafter referred to as a polymerizable ethenedioic acid in the presence or absence of other ethylenic copolymerizable compounds especially acrylonitrile. The invention also relates to compositions of these polymerization products adapted to the formation of shaped articles, in many cases to molecularly oriented shaped articles, particularly to fibers, threads, bristles, mono-filaments, etc., hereinafter referred to as fibers, and other shaped articles such as films and the like, which articles show improved dyeing properties.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoliation of material by gelation during storage, embrittlement of fibers, fouling of spinning jets, and other production difficulties.

In accordance with the present invention it has now been found that crosslinking is avoided and that improvements in dyeing properties of acrylonitrile polymers are obtained by the polymerization of polymerizable masses comprising acrylonitrile and an N-(dialkylamino aryl) amide of a polymerizable ethenedioic acid with or without other copolymerizable ethylenic compounds. It has been found in addition to the fact that although the N-(dialkylamino aryl) amides of polymerizable ethenedioic acids yield particularly valuable copolymers with acrylonitrile, they can also be used effectively to form copolymers with other types of copolymerizable ethylenic compounds having a $CH_2=C<$ group. Thus it has been found that valuble polymerization products are prepared in accordance with the invention by polymerizing a mass comprising an N-(dialkylamino aryl) amide of a polymerizable ethenedioic acid and a polymerizable compound such as acrylonitrile and the other polymerizable ethylenic compounds listed hereinafter.

The amides used in the practice of this invention are formed by reacting an amide-forming dialkylamino aryl amine, i. e. a dialkylamino aryl amine having a replaceable N-hydrogen with a polymerizable ethenedioic acid or derivative thereof such as the anhydride, the acid chloride, the mono-esters and the mono-amides. Both the mono- and di-amides can be formed. However, when the amidation is carried only to the mono stage the remaining carboxyl group can be esterified or amidated with ammonia or another amine. The readily polymerizable ethenedioic acids include maleic acid, fumaric acid, citraconic acid and mesaconic acid. These acids are represented by the general formula $$HOOC—CH=CR'—COOH$$

in which R' is either hydrogen or the methyl radical. (The formulas herein are not intended to distinguish between cis and trans forms.) In this application the term "maleic," when used in conjunction with the indefinite article or a plural in the naming of the amide, encompasses the fumaric, citraconic and mesaconic derivatives as well.

The N-(dialkylamino aryl) maleic acid amides used in the practice of the invention are represented by the formula $$\left[\begin{array}{c} CR'—CO \\ \| \\ CH—CO \end{array}\right]\begin{array}{c} —Y \\ —Z \end{array}$$

in which Y is the radical Z or the radicals RO— and $R_2N—$ in which R is hydrogen or the alkyl, aryl, aralkyl, alkaryl, or cycloaliphatic groups which can have halogen-, acyloxy-, or alkoxy- substituents or when Y is $R_2N—$ the R's can be linked together to form with the nitrogen a heterocyclic group; R' is hydrogen or the methyl group; and Z is the group $$—N—A—NR_2'''\ |\ R''$$

in which R'' is hydrogen or an alkyl group; the radical $—NR_2'''$ is a dialkylamino group; and A is an aryl nucleus such as benzene or naphthalene. The alkyl groups can be methyl, ethyl, isopropyl, n-butyl, sec-butyl, amyl, hexyl, decyl and the like. Preferably the alkyl groups do not contain more than three carbon atoms and the aryl nucleus is unsubstituted except for hydrocarbon substituents containing a total of not more than four carbon atoms.

When the amides used in the practice of the invention contain an ester group or an amide group other than group Z the radical R is methyl, ethyl, propyl, isopropyl, n-butyl, sec-butyl, amyl, hexyl, decyl, chloromethyl, chloroethyl, cyclohexyl, methyl-cyclopentyl, propylcyclopentyl, amyl-cyclopentyl, methyl-cyclohexyl, dimethylcyclohexyl, chlorocyclohexyl, phenyl, chlorophenyl, xenyl, naphthyl, tolyl, chlorotolyl, xylyl, ethyl-phenyl, propyl-phenyl, isopropyl-phenyl, benzyl, chlorobenzyl, phenethyl, phenyl-propyl, phenyl-butyl, acetoxy-ethyl, chlorophenoxy-ethyl, acetoxy-propyl, acetoxy-isopropyl, acetoxy-phenyl, acetoxy-benzyl, acetoxy-tolyl, acetoxy-cyclohexyl, methoxy-propyl, ethoxy-propyl, methoxy-phenyl, methoxy-benzyl, methoxy-tolyl, methoxy-cyclohexyl, etc., or part of a heterocyclic amino group, such as, the piperidyl, piperazino and morpholino groups.

For reasons of economy and ease of preparation, the methyl or ethyl ester of N-(dimethyl amino phenyl) maleic acid amide is usually preferred when an ester is used and has the formula $$\left[\begin{array}{c} CH—CO \\ \| \\ CH—CO \end{array}\right]\begin{array}{c} —OR \\ —NH—C_6H_4N(CH_3)_2 \end{array}$$

where R is methyl or ethyl. These monoesters are prepared simply by refluxing methanol or ethanol with maleic anhydride, and the acid ester is then converted to the acid chloride by refluxing with thionyl chloride and thereafter reacted with p-amino dimethyl aniline to produce the methyl ester, N-(p-dimethyl amino phenyl) amide of maleic acid. The mono-acid N-(p-dimethyl amino phenyl) maleic acid amide is conveniently prepared by reacting maleic anhydride with the amino dimethyl aniline. The acid chloride and anhydride are sufficiently reactive to form the amide merely upon mixing at room temperature. In some cases where the acid chloride or anhydride is not as reactive or in order to get more complete reaction, gentle heating may be advantageous. As an alternate synthesis of the ester-amide, this acid can be readily converted to a sodium or potassium salt and esterified with dimethyl or diethyl sulfate to the corresponding ester.

The proportions of the amide in the polymerization products of the invention can vary over a wide range, ranging from equimolar proportions of amide down to very small amounts of amide such as can be employed in acrylonitrile polymers to impart dye susceptibility thereto. Although even smaller amounts are somewhat effective, the improvement in susceptibility of acrylonitrile copolymers to dyes becomes particularly noticeable when the amide content of the copolymer is about 0.1 per cent and the susceptibility increases as the amount of amide is increased. Ordinarily sufficient improvement in dye susceptibility is obtained with amounts of amide ranging up to about 10 or 15 per cent but it may be advantageous for reasons such as in the preparation of ion-exchange polymers or additives to improve dyeing properties to have a larger proportion of amide in the acrylonitrile copolymer. In such cases the concentration of amide can range up to or approaching 50 mole per cent. Within these proportions acrylonitrile copolymers of the invention show great affinity toward many dyes especially basic, acidic, vat, and cellulose acetate dyes.

In addition to the improvements effected in the resulting copolymers, the use of N-(dialkylamino aryl) maleic acid amides has certain other advantages over the use of the corresponding acids. For example, the amides are more soluble in acrylonitrile than the acids. Therefore it is generally easier to get complete copolymerization of the amide with acrylonitrile in solution, emulsion and suspension polymerizations. Still further advantages accrue from the presence of these amides. Thus when nonesterified monoamides are used the copolymers of the invention show high susceptibility to basic dyes.

The acrylonitrile copolymers discussed herein are soluble in N,N-dimethyl acetamide (DMA), N,N-dimethyl formamide (DMF), butyrolactone, ethylene carbonate, N,N-dimethyl methyl urethane of the formula $(CH_3)_2NCOOCH_3$, ethylene carbamate, N-methyl-2-pyrrolidone, and a number of similar solvents, used alone or in conjunction with N,N-dimethyl cyanamide, N,N-dimethyl cyano-acetamide, N,N-dimethyl methoxy-acetamide, methylene dinitrile, methylene di-thiocyanate, formyl caprolactam, formyl morpholine, tetramethylene sulfone, etc. Nitroalkanes, such as nitromethane, may be used as solvents for such copolymers having no more than about 85 per cent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

Example I

Five polymers of acrylonitrile are prepared from the following monomer compositions

| Polymer | Acrylonitrile | N-(p-dimethyl-amino phenyl) maleamic acid |
| --- | --- | --- |
| | Parts | Parts |
| A | 100 | |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 750–1000 parts of distilled water at 30–50° C. containing dissolved therein one part of ammonium persulfate, 0.6 to 1.5 parts of sodium bisulfite and 0.5 part of sodium dodecyl-benzene sulfonate. The reaction is continued for 2–6 hours, at which time a yield of about 90 per cent solid polymer is precipitated. The resulting polymers have molecular weights over 10,000. Each polymer is dissolved in N,N-dimethyl acetamide or butyrolactone and a film cast from each solution.

A water solution of methylene blue dye (a basic dye) is prepared by making a paste of the dye and then diluting to a 1 per cent by weight dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film shows only a light tint, whereas the mono-N-(p-dimethylamino phenyl) maleic amide acid copolymers are a deeper and denser shade. Identical films, cold-drawn and heat-treated, show dyeing characteristics similar to the undrawn films.

Fibers are spun from the same N,N-dimethyl acetamide or butyrolactone solutions either by dry spinning or by wet spinning, into glycerine baths. The fibers are substantially freed from solvent and dried. After cold-drawing the dried fibers 600–900 per cent at 120–145° C. and subsequently heat-treating them at 150° C. for one hour, the fibers are given the same dyeing and washing treatment described above with the same results as for the films, a light tint being acquired by the unmodified polyacrylonitrile fibers and a deeper and denser color being given to the maleic copolymer fibers of this invention.

Instead of N-(p-dimethylamino phenyl) maleic amide acid, the various N-(dialkylamino aryl) maleic amide acids disclosed above can be used.

Example II

Five polymers of acrylonitrile are prepared from the following monomer compositions

| Polymer | Acrylonitrile | Methyl ester of N-(p-dimethyl-amino phenyl) maleamic acid |
| --- | --- | --- |
| | Parts | Parts |
| A | 100 | |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 0.5 to 1 part sodium dodecyl-benzene sulfonate, 1.0 part of ammonium persulfate, 0.5 part of sodium bisulfite, and 100 parts of monomer or monomer mixture. The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol and dried. A portion of the polymer is dissolved in dimethyl formamide or butyrolactone and a film cast from the solution. The film is washed entirely free of solvent and stretched at a ratio of about 8:1 in a glycerine bath at 135 to 145° C. The film is then washed in water and dyed in a bath containing for each part of film 0.05 part of 1,5-diamino-4,8-dihydroxy-anthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 per cent soap solution at 85° C. Whereas the unmodified polyacrylonitrile when treated in this manner has little or no color, all of the copolymers are dyed to a deeper blue shade.

Fibers are spun from the same solutions either by dry spinning, or by wet spinning. The fibers are substantially freed from solvent and dried. After cold-drawing the dried fibers 600–900 per cent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, tetramethyl urea, butyrolactone, ethylene carbonate, formyl morpholine, etc.

Instead of the monomethyl maleic ester amide of the above example, various other esters of the maleamic acid can be used, such as the ethyl, propyl, isopropyl, butyl isobutyl, tertiary-butyl, hexyl, tolyl, phenyl, naphthyl, cyclopentyl, cyclohexyl, benzyl, phenethyl, etc. esters. Likewise the esters of the other N-(dialkylamino aryl) maleamic acids disclosed above can be used.

*Example III*

Five parts of the copolymer fiber D of Example I is dyed to a deep green shade using the vat color dimethoxy-dibenzanthrone at 70° C. in a bath containing 0.5 part of dye, 0.25 part sodium hydroxide, 0.5 part sodium hydrosulfite and 100 parts of water (20:1 bath-fiber ratio). After the first 15 minutes of heating, 0.25 part of Glauber's salt is added. The sample is then oxidized in a 0.5 per cent sodium dichromate 1.0 per cent acetic acid aqueous solution at 70° C. for 30 minutes in a 20:1 bath-fiber ratio. The dyed fiber was then scoured in a 0.5 per cent boiling soap solution. A sample of yarn prepared from the unmodified polyacrylonitrile and dyed under the same conditions acquired only a light shade of color.

If 1,5-di-p-anisoylamino-4,8-dihydroxyanthraquinone is used as the vat dye, the copolymer fiber is dyed a strong violet color.

*Example IV*

The procedure of Example I is repeated for the polymerization of the following monomer compositions.

| Polymer | Acrylonitrile | Vinyl Chloride | Methyl ester of N-(p-dimethylphenyl) maleamic acid | Copolymer Soluble in— |
|---|---|---|---|---|
| | Parts | Parts | Parts | |
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO₂Me. |
| E | 57 | 40 | 3 | NO₂Me. |
| F | 37 | 60 | 3 | Acetone. |

Sometimes copolymers D and E, when dissolved in nitromethane may have gelled, partially dissolved particles known as fisheyes. In such cases, the solubility may be improved by the addition of small amounts of materials which are good solvents for acrylonitrile polymers, such as butyrolactone, ethylene carbonate, dimethyl formamide, dimethyl acetamide, tetramethyl urea, etc. In addition, certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those of Example I.

The procedure of this example may also be used with the various other mono maleic amide esters set forth above.

*Example V*

The procedure of Example I is repeated for the polymerization of the following monomer compositions:

| Polymer | Acrylonitrile | Styrene | Methyl ester of N-(p-dimethylamino phenyl) maleamic acid |
|---|---|---|---|
| | Parts | Parts | Parts |
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example I. In place of styrene, various styrene derivatives may be used, such as alpha-methyl-styrene; nuclear-substituted chloro-styrenes, i. e., ortho-, meta-, and para-chloro-styrenes, dichlorostyrenes, for example, the 2,3-, 2,4-, 2,5-, 2,6-, 3,4-, and 3,5-dichloro-styrenes, trichloro-styrenes; cyano-styrenes, such as ortho-, meta-, and para-cyano-styrenes, dicyanostyrenes; nuclear substituted alkyl-styrenes, such as mono- and di-methyl-styrenes, mono- and di-ethyl-styrenes, mono- and di-isopropyl-styrenes; aryl-substituted styrenes, i. e., para-phenyl-styrene, etc.; cycloaliphatic-substituted styrenes, such as para-cyclohexyl-styrene; fluoro-styrenes, such as ortho-, meta-, para-fluoro-styrene, difluoro-styrenes, etc.; trifluoromethyl-styrenes, such as ortho-, meta-, and para-trifluoromethyl-styrenes, di-(trifluoromethyl)-styrenes, and various other styrenes or mixtures of any number of these with each other or with styrene.

The procedure of this example may also be used with the various other mono maleic amide esters set forth above.

*Example VI*

The procedure of Example I is repeated for the polymerization of the following monomer compositions:

| Polymer | Acrylonitrile | Vinylidene Chloride | Methyl ester of N-(dimethylamino tolyl) maleamic acid | Copolymer Soluble in— |
|---|---|---|---|---|
| | Parts | Parts | Parts | |
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of at least 85 per cent in the polymer molecules, only the more active solvents, such as butyrolactone, ethylene carbonate, N,N-dimethyl acetamide, N,N-dimethyl formamide, N,N,N',N'-tetramethyl urea, etc., can be used as solvents. The above copolymers dye more readily and thoroughly than similar copolymers containing no N-(dialkyl amino aryl) maleic amide.

The procedure of this example can also be used with the various other mono maleic amide esters set forth above.

*Example VII*

The procedure of Example I is repeated for the polymerization of the following monomer compositions:

| Polymer | Acrylonitrile | Vinylidene Chloride | Vinyl Choride | Ethyl ester of N-(dimethylamino phenyl) maleamic acid |
|---|---|---|---|---|
| | Parts | Parts | Parts | Parts |
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example I.

The procedure of this example can also be used with the various other mono maleic amide esters set forth above.

*Example VIII*

Instead of copolymerizing the N-(dialkylamino aryl) maleic acid amides with the acrylonitrile, copolymers of the maleic amide, such as polymers D and E of Example II, may be used as modifiers for the unmodified homopolymers and copolymers of acrylonitrile. For example, polymer E of Example II, which consists of 80 parts of acrylonitrile and 20 parts of methyl ester of N-(p-dimethylamino phenyl) maleamic acid, has excellent compatibility with homo polymers of acrylonitrile. In many cases, it is desirable to use the copolymers of the N-(dialkylamino aryl)-type maleic acid amides, which have even a higher ratio of the maleic amide, as for example, as high as equal molar ratios of the maleic amide copolymerized with acrylonitrile or methacrylonitrile. Suitably from about 10 to 15 to about 70 per cent of amide may be used. The overall amounts of amide required to improve the dyeability generally corresponds to the amounts indicated above for copolymers in which the main body of the acrylonitrile polymers contain the amide copolymerized directly therein, that is, from at least about 0.1 per cent to advantageously 5 per cent or even up to 15 per cent amide in the ultimate polymer mixture. The copolymers of maleic amides with other monomers are also satisfactory such as, for example, copolymers of styrene, methyl acrylate, ethyl methacrylate, alpha-methyl-styrene, etc., and these copolymers may be prepared substantially in accordance with the procedure of Example I. A solution of these copolymers is prepared in dimethyl formamide and added to a dimethyl formamide solution of polyacrylonitrile, so that a composition containing 90 parts combined acrylonitrile and other monomer units and about 10 parts of the amide units is obtained. The solution is heated to 130° C. after which the solution is filtered. Films and fibers prepared from this mixture are dyed in accordance with the process of Example III and satisfactory dyed, shaped articles are obtained. The unmodified polyacrylonitrile without the addition of these maleic amides showed little or no dye retention.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing at least one structural unit present in the acrylonitrile copolymer. Thus as there are present in the acrylonitrile copolymer, structural units derived from the acrylonitrile and styrene, it is desirable to have present in the modifying copolymer structural units derived from styrene and/or acrylonitrile, advantageously both, in addition to those derived from the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The di-N-(dialkylamino aryl) maleic amides of the structure

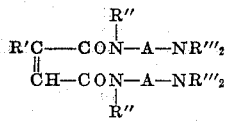

can be used instead of the monoamide in the practice of the invention.

The polymerization products of the present invention have in the polymer molecule a plurality of repeating units of the formula

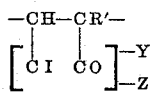

in which Y, Z, and R' are as indicated above and will contain additional repeating units of the formula

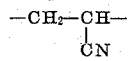

when the amide is copolymerized with acrylonitrile.

In addition, the polymerization products may contain any number of repeating units of the type obtained by the copolymerization of N-(dialkylamino aryl) maleic acid amide or a mixture of acrylonitrile and the amide with one or more copolymerizable ethylenic compounds, such as for example, vinylidene chloride, vinyl chloride, styrene, alpha-methyl-styrene and methacrylonitrile. When the polymerization mass contains, in addition to the maleic acid amide derivative, a polymerizable monomer having a CH₂=C< group in an amount such that the latter monomer is present to an extent of at least 50 mole per cent of the overall monomer content, then monomers such as fumaronitrile, beta-cyano-acrylamide and methyl beta-cyano-acrylate may also be present in the polymerization mixture.

As previously indicated, the solvent resistance of such copolymers as contain one or more monomer units in addition to those formed by the acrylonitrile and the N-(dialkylamino aryl) maleic amide is affected by the type and proportion of copolymerizing monomer or monomers used to replace part of the acrylonitrile. For example, copolymers containing small amounts of maleic amide units may contain various proportions of such monomer units as obtained from vinylidene chloride, methacrylonitrile, fumaronitrile, and beta-cyano-acryl-amide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile N-(dialkylamino aryl) maleic amide type copolymer will decrease much more when a monomer having relatively weak secondary bonding forces, such as styrene or ethylene is used to replace part of the acrylonitrile than when one or more monomer having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which may also be present in the polymerizable masses for copolymerization with the N-(dialkylamino aryl) maleic amides include one or more of the following: acrylates, e. g. methyl acrylate; methacrylates, e. g. methyl methacrylate; acrylamides; methacrylamides; vinyl esters, such as vinyl acetate; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes and the nuclear-substituted styrenes listed in Example V, etc.

The polymerization products of this invention may be prepared by various polymerization systems, such as emulsion, suspension, mass and solution polymerizations. In addition to the monomers, the polymerizable mass may contain also other materials such as catalysts, e. g. peroxides, such as benzoyl peroxide, naphthyl peroxides, phthalyl peroxide, tertiary-butyl hydro-peroxide, hydrogen peroxide, cyclohexyl hydroperoxide, tertiary-butyl perbenzoate, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation is parallel to the fiber axis or a major surface.

Useful fibers may be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., may be used as a precipitating bath for N,N-dimethyl acetamide, N,N,N',N'-tetramethyl urea, butyrolactone, ethylene carbonate, and other solvent compositions of these copolymers. The extruded fibers, from which substantially all of the solvent has been removed in the spinning step, about 1–10 per cent remaining in the shaped article, may then be cold-drawn about 100–900 per cent, preferably about 300–600 per cent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention may be molecularly oriented, especially if there is no more than 15 per cent of N-(dialkylamino aryl) maleic acid amide in the copolymer molecule. This is true when the major portion of the copolymer is acrylonitrile, for example, 85 per cent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the maleic acid amide, the proportion of acrylonitrile in the copolymers may be much less than 85 per cent without destroying the capacity for molecular orientation. Molecularly oriented, cold-drawn, shaped articles of particular usefulness are prepared from copolymer compositions containing in the polymer molecules 60–99.9 per cent acrylonitrile, 0.1–15 per cent advantageously, 0.1–5 per cent N-(dialkylamino aryl) maleic acid amide, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of the monomers of this class being noticeable when the monomer is present in the polymer molecule in amounts of one per cent or more.

The polymerization products of this invention show great affinity for the acetate, basic, acidic and vat dyes. The cellulose acetate dyes which are effective with these polymerization products are mainly amino-anthraquinone derivatives. The basic dyestuffs toward which these polymerization products show great affinity are preferably those which contain amido, alkylamido, or ammonium groups, such as —NH$_2$, —N(CH$_3$)$_2$, —N(C$_2$H$_5$)$_2$, —NHC$_6$H$_5$, —N(CH$_3$)$_3$OH, etc. and which may also be used in the form of their salts, i. e. the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these polymerization products are mainly amino-anthraquinone derivatives, basic azo compounds and other basic substances, such as the Duranol, Dispersol, Sericol, etc. dyestuffs. A number of other acidic dyes that can be used are anthranilic acid→1-(4'-sulfophenyl), 3-methyl-5-pyrazolone; 1,5-diamino-4,8-dihydroxyanthraquinone-3-sulfonic acid; the 1-aminonaphthalene-4-sulfonic acid→alpha-naphthol-4-sulfonic acid; the sodium salt of sulfanilic acid→aniline→2-benzoyl-amino-5-naphthol-7-sulfonic acid; the sodium salt of 4,4'-diaminostilbene-2, 2'-di-sulfonic acid⇉(phenol)$_2$ ethylated; 1,5-diamino-,4,8-dihydroxyanthraquinone-3-sulfonic acid; dye prepared by diazotizing 1-aminonaphthalene-4-sulfonic acid and coupled with alpha-naphthol-4-sulfonic acid; the sodium salt of (m-aminobenzoic acid→o-anisidene) phosgenated; the sodium salt of (2-naphthol-6,8-disulfonic acid←benzidine→phenol) ethylated; dimethoxy-dibenzanthrone; and 1,5-di-p-anisoylamino-4,8-dihydroxyanthraquinone.

From the molecularly orientable copolymers of this invention fibers may be prepared having improved dyeing properties, low shrinkage in boiling water, sometimes as low as 3 to 5 per cent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

What is claimed is:

1. The polymerization product having acid reactive groups obtained by polymerizing a mass comprising a polymerizable monomer having CH$_2$=C< group and an amide of a polymerizable ethenedioic acid having the formula HOOCCH=CR'COOH 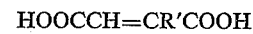

in which R' is selected from the class consisting of hydrogen and the methyl radical and a dialkylamino benzenoid hydrocarbon aryl amine in which the alkyl groups contain not more than three carbon atoms each and the aryl group contains not more than fifteen carbon atoms.

2. The composition of claim 1 in which the mass contains a polymerizable ethylenic compound selected from the class consisting of acrylonitrile, vinyl chloride, vinylidene chloride, styrene, alpha-methyl-styrene, methacrylonitrile, fumaronitrile, beta-cyano-acrylamide, and methyl-beta-cyano-acrylate.

3. The polymerization product having acid reactive groups obtained by polymerizing a mass comprising acrylonitrile and an amide of a polymerizable ethenedioic acid having the formula HOOCCH=CR'COOH 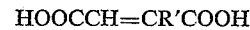

in which R' is selected from the class consisting of hydrogen and the methyl radical and a dialkylamino benzenoid hydrocarbon aryl amine in which the alkyl group contains not more than three carbon atoms each and the aryl group contains not more than fifteen carbon atoms.

4. The copolymer of claim 3 in which the amide is present in at least about 0.1 per cent of the polymerizable mass.

5. A polymerization product having acid reactive groups obtained by polymerizing a mass comprising a polymerizable monomer having a CH$_2$=C< group and an N-(dialkylamino benzenoid hydrocarbon aryl) maleic amide acid in which the alkyl groups contain not more than three carbon atoms each and the aryl group contains not more than 15 carbon atoms.

6. A polymerization product having acid reactive groups obtained by polymerizing a mass comprising a polymerizable monomer having a CH$_2$=C< group and an ester of an N-(dialkylamino benzenoid hydrocarbon aryl) maleic acid monoamide in which the alkyl groups contain not more than three carbon atoms each and the aryl group contains not more than 15 carbon atoms.

7. A polymerization product having acid reactive groups obtained by polymerizing a mass comprising a polymerizable monomer having a CH$_2$=C< group and the methyl ester of N-(dialkylamino benzenoid hydrocarbon aryl) maleic acid monoamide in which the alkyl groups contain not more than three carbon atoms each and the aryl group contains not more than 15 carbon atoms.

8. A polymerization product having acid reactive groups obtained by polymerizing a mass comprising a polymerizable monomer having a CH$_2$=C< group and an N-(dialkylamino benzenoid hydrocarbon aryl) maleic acid diamide in which the alkyl groups contain not more than three carbon atoms each and the aryl group contains not more than 15 carbon atoms.

9. A polymerization product having acid reactive groups obtained by polymerizing a mass comprising a polymerizable monomer having a CH$_2$=C< group and an N,N'-di(dialkylamino benzenoid hydrocarbon aryl) maleic acid diamide in which the alkyl groups contain not more than three carbon atoms each and the aryl group contains not more than 15 carbon atoms.

10. A polymeric composition having in the polymer molecule a plurality of repeating acid reactive units having the formula

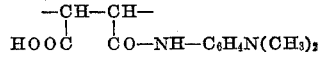

11. The polymerization product of claim 10 which contains in the polymer molecule a plurality of repeating units of the formula

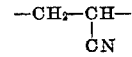

12. A shaped article comprising a copolymer of acrylonitrile and an N-(dialkylamino benzenoid hydrocarbon aryl) maleic acid amide in which the alkyl groups contain not more than three carbon atoms each and the aryl group contains not more than 15 carbon atoms, said copolymer having repeating acid reactive groups and a molecular weight of at least 10,000.

13. A cold-drawn fiber having molecular orientation and dye susceptibility to acid dyes, said fiber comprising a copolymer of acrylonitrile and an N-(dialkylamino benzenoid hydrocarbon aryl) maleic acid amide in which the alkyl groups contain not more than three carbon atoms each and the aryl group contains not more than fifteen carbon atoms, said copolymer having a molecular weight of at least about 10,000 and containing in the polymer molecule no more than about 15 per cent by weight of said amide.

14. A cold-drawn fiber having molecular orientation and dye susceptibility to acid dyes, said fiber comprising a copolymer of about 60–98.9 per cent by weight acrylonitrile, about 0.1 to 5 per cent by weight N-(dialkylamino benzenoid hydrocarbon aryl) maleic acid amide in which the alkyl groups contain not more than three carbon atoms each and the aryl group contains not more than fifteen carbon atoms, and about 1 to 39.9 per cent by weight of a compound selected from the class consisting of vinyl chloride, vinylidene chloride, styrene, alpha-methyl-styrene, methacrylonitrile, fumaronitrile, beta-cyano-acrylamide, and methyl-beta-cyano-acrylate.

15. A cold-drawn fiber having molecular orientation and dye susceptibility to acid dyes, said fiber comprising a copolymer of about 60–98.9 per cent by weight acrylonitrile, about 0.1 to 5 per cent by weight N-(dialkylamino benzenoid hydrocarbon aryl) maleic acid amide in which the alkyl groups contain not more than three carbon atoms each and the aryl group contains not more than fifteen carbon atoms and about 1 to 39.9 per cent by weight vinylidene chloride.

16. A cold-drawn fiber having molecular orientation and dye susceptibility to acid dyes, said fiber comprising a copolymer of about 60–98.9 per cent by weight acrylonitrile, about 0.1 to 5 per cent by weight N-(dialkylamino benzenoid hydrocarbon aryl) maleic acid amide in which the alkyl groups contain not more than three carbon atoms each and the aryl group contains not more than fifteen carbon atoms and about 1 to 39.9 per cent by weight vinyl chloride.

17. A cold-drawn fiber having molecular orientation and dye susceptibility to acid dyes, said fiber comprising a copolymer of about 60–98.9 per cent by weight acrylonitrile, about 0.1 to 5 per cent by weight N-(dialkylamino benzenoid hydrocarbon aryl) maleic acid amide in which the alkyl groups contain not more than three carbon atoms each and the aryl group contains not more than fifteen carbon atoms and about 1 to 39.9 per cent by weight styrene.

18. A cold-drawn fiber having molecular orientation and dye susceptibility to acid dyes, said fiber comprising a copolymer of about 60–98.9 per cent by weight acrylonitrile, about 0.1 to 5 per cent by weight an amide having the following formula $$HOCOCH=CHCONHC_6H_4N(CH_3)_2$$

and about 1 to 39.9 per cent by weight of a compound selected from the class consisting of vinyl chloride, vinylidene chloride, styrene, alpha-methylstyrene, methacrylonitrile fumaronitrile, beta-cyano-acrylamide, and methyl-beta-cyano-acrylate.

19. The polymerization product having acid reactive and base reactive groups obtained by polymerizing a mass comprising a polymerizable monomer having $CH_2=CH<$ group and N-(para-dimethylamino-phenyl) maleamic acid.

20. The polymerization product having acid reactive and base reactive groups obtained by polymerizing a mass comprising acrylonitrile and N-(para-dimethylamino-phenyl) maleamic acid.

References Cited in the file of this patent

UNITED STATES PATENTS 2,371,104    Kienle _____ Mar. 6, 1945

OTHER REFERENCES

Fieser et al., "Organic Chemistry" (D. C. Heath and Co.; Boston; 1944), page 32.